No. 810,229. PATENTED JAN. 16, 1906.
H. STANGE.
WARMING KETTLE.
APPLICATION FILED FEB. 13, 1905.

Witnesses
William Schuchardt
Arthur Kline

Inventor
Herman Stange,
by John Elias Jones,
his attorney.

UNITED STATES PATENT OFFICE.

HERMAN STANGE, OF CINCINNATI, OHIO.

WARMING-KETTLE.

No. 810,229. Specification of Letters Patent. Patented Jan. 16, 1906.

Application filed February 13, 1905. Serial No. 245,491.

*To all whom it may concern:*

Be it known that I, HERMAN STANGE, a citizen of the United States of America, and a resident of Cincinnati, in the county of Hamilton and State of Ohio, have invented certain new and useful Improvements in Warming-Kettles, of which the following is a specification.

This invention relates to certain improvements in that class of kettles which are designed especially for use by street venders for carrying wienerwurst, tamales, &c.; and the object of the invention is to provide a device of this general character of a simple and inexpensive nature and of a compact, strong, and durable construction which shall be adapted for convenient use and for ready repair and cleansing.

The invention consists in certain novel features of the construction, combination, and arrangement of the several parts of the improved kettle whereby certain important advantages are attained and the device is made simpler, cheaper, and otherwise better adapted and more convenient for use, all as will be hereinafter fully set forth.

The novel features of the invention will be carefully defined in the claims.

Figure 1:
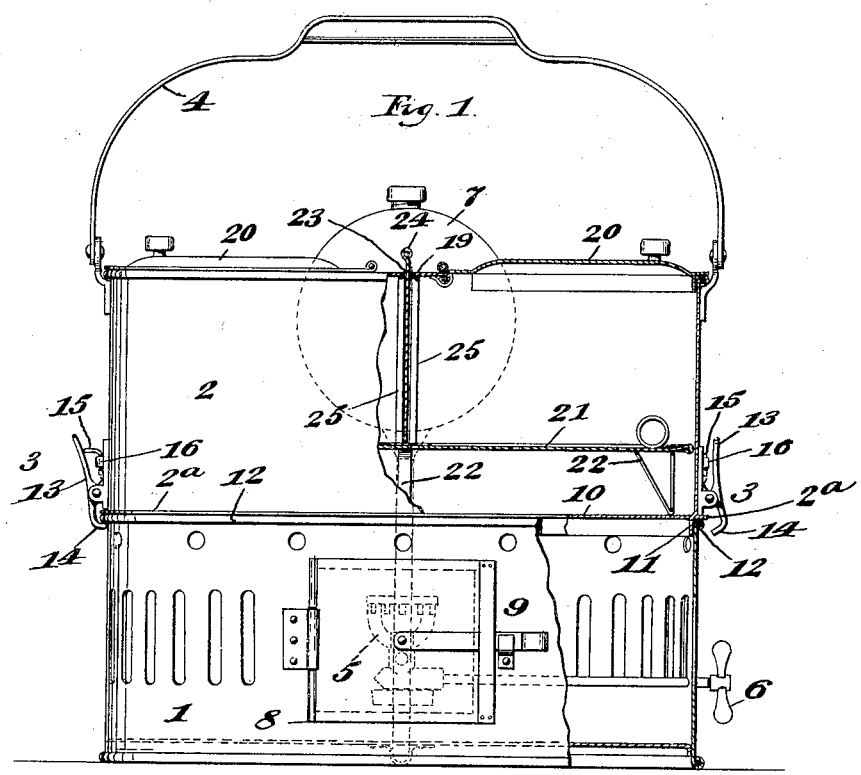
Figure 2:
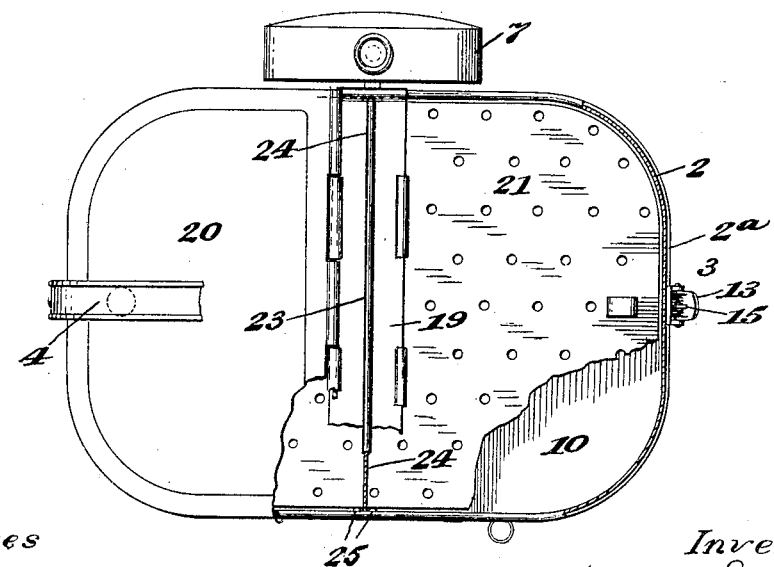

In the accompanying drawings, which serve to illustrate my invention, Figure 1 is a side elevation, partly in section, and showing a street-vender's kettle constructed according to my invention. Fig. 2 is a plan view, also partly in section, and showing the improved kettle.

The improved street-vender's kettle constructed according to my invention comprises two detachably-connected parts or members, a lower part or member 1 and an upper part or member 2, these parts or members being constructed from sheet metal in proper form and having at their ends detachable connections 3 3 for holding them in relation.

4 indicates a hinged bail-like handle connected with the upper member or part 2, so that the device may be readily carried about from place to place.

In the lower part or member 1 is arranged a gasolene-burner of a well-known kind, as indicated in dotted lines at 5 in Fig. 1, and at one end of said lower member is arranged a handle 6, held upon a projecting end portion of the stem of the controlling-valve of said burner.

7 indicates a gasolene reservoir or tank at one side of the kettle and having a supply-pipe connected with the burner 5 in a well-known way.

In one side of the lower part or member 1 of the improved kettle is produced an opening adapted to be covered over by a hinged door 8, having a latch 9, and said opening affords access to the gasolene-burner, so that the same may be lighted and inspected when desired. The walls of the lower part or member 1 are provided with perforations for the entry of air and the escape of products of combustion.

The upper part or member 2 of the improved kettle has imperforate side walls, and its bottom 10 is also made imperforate, so that leakage of the contents is prevented, said bottom 10 having an annular downwardly-extended flange 11, adapted to fit inside of the upper edge portion of the side wall of the lower part or member 1, whereby a slip-joint is produced between the two parts or members. The upper edge of the side wall of the lower part or member is also beaded or wired, as indicated at 12, and the upper part or member 2 has an outwardly-directed ledge or projection $2^a$ extended around it and adapted to rest upon said beaded or wired edge portion 12 to afford a secure support of the upper member upon the lower.

The detachable fastening devices 3 3 for holding the parts or members in relation are carried upon the end portions of the upper member 2, as herein shown, although it is obvious they may be otherwise located, and, as shown on the drawings, said devices comprise spring-actuated clips 13, pivotally held to the parts or members 2 with hook-like lower ends 14, adapted to be engaged by the actuating-springs of said clips beneath the beaded or wired edge portion 12 of the lower member 1 in such a way as to produce a secure connection between the members. By pressing upon the upper end portions of the clips 13 it is evident that said hook-shaped lower end portions 14 may be drawn outward, as shown at the right-hand side of Fig. 1, to disengage them from the beaded edge portion 12 of the lower member, whereupon the upper member 2 may be removed from said lower member, so as to permit access to the whole interior of the lower member, whereby repairs and cleaning may be conveniently effected.

In connection with the fastening devices comprising the clips 3 3 I provide locking means consisting of detents 15, produced from bent wires of L-shaped form, having vertical members pivotally held upon the end walls of the upper member 2, with horizontal arms adapted to be swung outwardly, as shown at the left-hand side of Fig. 1, for engagement within the upper end portions of the clips 3 to prevent such actuation of said clips as tends to disengage their lower hook-like portions from the beaded edge of the lower member. By means of these detents it is evident that the clips will be held securely against accidental release; but when it is desired to disconnect the members this may be readily accomplished by swinging the detents pivotally, as seen at the right-hand side of Fig. 1, so as to disengage their horizontal arms from the spring-actuated clips.

The upper member 2 is open at its top and is adapted to be covered by a lid or cover-plate comprising a central transversely-extended portion 19, to which are hinged oppositely-arranged lids or covers 20 20, which may be independently opened or raised and are adapted to be closed over the opposite ends of the kettle, as shown in Fig. 1. Within the upper member 2 is removably held a perforated tray 21, having feet or legs 22, adapted to support it above the bottom 10, and in the central strip or portion 19 of the cover-plate is produced a longitudinally-extended slitted opening 23, through which is adapted to be passed a removable partition-plate 24, which is extended down within the member 2, with its lower edge rested upon the tray 21 and its opposite lateral edges engaged between guides 25 25, produced upon the opposite side walls of the member 2. By this construction it will be seen that the cover-plate, comprising the strip or portion 19 and its connected lids or covers 20 20, may be entirely removed from the member 2 to afford free access to the interior thereof, and the tray 21 may also be similarly removed from said member. When the parts are in relation, as shown, it is also evident that the interior of the member 2 above the tray 21 is divided by the transverse removable partition 24 into two compartments at opposite ends of the member 2 and in which may be contained different articles, convenient access being afforded to each compartment by means of the hinged lid or cover above the same.

From the above description of my improvements it will be evident that the improved street-vender's kettle constructed according to my invention is of an extremely simple and inexpensive nature and is especially well adapted for use by reason of the peculiar construction, wherein the members are adapted for detachable connection, and the interior of the upper member is formed into separated compartments, wherein may be contained different articles. It will also be obvious from the above description that the improved kettle is capable of some modification without material departure from the principles and spirit of the invention, and for this reason I do not desire to be understood as limiting myself to the precise form and arrangement of the several parts of the device herein set forth in carrying out my invention in practice.

Having thus described my invention, what I claim, and desire to secure by Letters Patent, is—

1. A device of the character described comprising an upper member having a closed bottom provided with a pendent flange extended around it and having a ledge extended outside the flange, spring-clips oppositely arranged upon said upper member and provided with hook-shaped ends beneath said ledge and a lower member open at its top to receive the pendent flange of the upper member and adapted to contain a heater and having side walls, the upper edges of which are provided with a continuous external bead for supporting engagement with the ledge of the upper member and for detachable engagement with the hook-shaped lower ends of the clips thereon.

2. A device of the character described comprising an upper member having a closed bottom provided with a pendent flange extended around it and having a ledge extended outside the flange, spring-clips centrally pivoted upon said upper member and provided with hook-shaped lower ends beneath said ledge and devices pivotally held on the upper member for engagement with the upper ends of the clips to hold them against movement.

3. A device of the character described comprising a member having a closed bottom, side walls and an open top, a single perforated tray removably supported therein and extended across the entire surface of the bottom thereof, a central strip transversely extended across the top of the member and provided with a longitudinal slotted opening, a partition removably passed through the slotted opening of the strip and removably inserted in the member with its lower part rested on said tray to divide the interior of the member into compartments, guides engaged with said removable partition and covers hinged at opposite sides of said strip and adapted, when lowered, to close the open top of the member and, when raised, to afford access to the compartments at opposite sides of the partition.

4. A device of the character described comprising a member having a closed bottom, side walls and an open top, a central strip transversely extended across the top of the member and provided with a longitudinal slotted opening, a partition removably passed through said slotted opening of the strip and removably inserted in the member to divide its interior into compartments, guides engaged with said removable partition and covers hinged at opposite sides of the strip and adapted, when lowered, to close the open top of the member and, when raised to afford access to the compartments at opposite sides of the removable partition.

Signed at Cincinnati, Ohio, this 11th day of February, 1905.

HERMAN STANGE.

Witnesses:
  JOHN ELIAS JONES,
  WILLIAM SCHUCHARDT.